UNITED STATES PATENT OFFICE.

WILHELM BUDDEUS, OF CHARLOTTENBURG, GERMANY.

TREATMENT OF ZINC-LYES.

1,120,683.   Specification of Letters Patent.   Patented Dec. 15, 1914.

No Drawing.   Application filed November 26, 1913.   Serial No. 803,201.

*To all whom it may concern:*

Be it known that I, Dr. WILHELM BUDDEUS, a subject of the Duke of Saxe-Coburg-Gotha, and resident of Charlottenburg, German Empire, have invented certain and useful Improvements in the Treatment of Zinc-Lyes, of which the following is a specification.

Many proposals have been made for the extraction of zinc from zinc lyes containing ferrous iron, such for example as the waste lyes obtained in processes of copper extraction, by means of iron, from copper ores containing zinc; the methods hitherto suggested have been found impracticable or too costly, with the result that, notwithstanding the considerable quantities of zinc that such lyes contain, they have not been utilized; moreover, if the lyes are discharged into streams they contaminate and poison the water.

Two-stage processes consisting in first converting the ferrous iron to the ferric state by oxidizing agents such as chlorin or nitric acid and then precipitating the ferric iron with basic material, such as lime, calcium carbonate, and the like, are of small account practically, owing to the high price of the oxidizing agents. Also, the oxidizing of the ferrous iron by adding bases or carbonates and then blowing air through, does not lead to complete oxidation and requires so much time and so great a quantity of compressed air that, technically speaking, it is impracticable to treat large quantities of the zinc lyes to a useful extent. Consequently this process of oxidation has been abandoned in practice; it presents the further defect that all the salts and the total quantity of chlorin remain in the lye and thereby render the extraction of the zinc in any form a difficult and expensive matter.

According to the present invention the zinkiferous lyes containing ferrous iron are treated with an amount of bases such as burnt lime, magnesia or ground lime stone, soda etc. sufficient to precipitate all the zinc and all the ferrous iron, the slimy mass obtained by filtration and washing of the precipitate is then dried in such a way as to cause oxidation of the ferrous iron completely to the ferric state; the dried mass is then treated with sufficient acid to remove the zinc compound, this being the constituent most readily attacked by the acid. The zinkiferous lyes treated may be the waste lyes from the known process of extraction of copper, by means of iron, from zinc-copper ores or metal waste in general containing copper and zinc.

If lime is used for the complete precipitation of the zinc and ferrous iron, the slimy mass resulting from filtration and leaching of the precipitate contains calcium sulfate as well as the iron and zinc oxids. During the drying of the mass, which is done by means of air, the ferrous oxid is oxidized completely to ferric oxid, as already stated. From the resulting product, consisting of ferric oxid, zinc oxid and calcium sulfate, the zinc can be removed in the form of zinc salts by treating with acids in the known manner, since the zinc oxid is dissolved by the acids before the ferric oxid. All that is necessary is to use a quantity of acid corresponding to the amount of zinc contained in the product under treatment, and to eliminate the resultant zinc salt by leaching and pressing.

The pure zinc lyes free from iron thus obtained can be treated by known methods to form other zinc compounds or to yield metallic zinc, as desired.

Having now particularly described and ascertained the nature of my said invention and in what manner the same is to be performed, I declare that what I claim is:—

The treatment of zinkiferous lyes containing ferrous iron, consisting in adding to the lye a base in sufficient quantity to precipitate all the zinc and all the ferrous iron, drying the filtered and washed precipitate, thereby causing complete oxidation of the ferrous iron into the ferric state, and treating the dried mass with an acid to dissolve out the zinc.

The foregoing specification signed at Magdeburg this 17th day of November, 1913.

DR. WILHELM BUDDEUS.

In presence of two witnesses:
FRIEDRICH SIEPKE,
WILHELM FLEISCHHACK.